United States Patent
Gogovitza

[19]

[11] Patent Number: 6,055,880
[45] Date of Patent: May 2, 2000

[54] TRANSFER RING AND GEAR ARRANGEMENT FOR NON-SLIP CONTINUOUSLY VARIABLE TRANSMISSION

[75] Inventor: Noru Gogovitza, Toronto, Canada

[73] Assignee: Designco Inc., Mississauga, Canada

[21] Appl. No.: 09/091,840

[22] PCT Filed: Jan. 3, 1997

[86] PCT No.: PCT/CA97/00002

§ 371 Date: Jul. 1, 1998

§ 102(e) Date: Jul. 1, 1998

[87] PCT Pub. No.: WO97/26469

PCT Pub. Date: Jul. 24, 1997

[30] Foreign Application Priority Data

Jan. 12, 1996 [CA] Canada ................................... 2167103
Oct. 1, 1996 [CA] Canada ................................... 2186927

[51] Int. Cl.[7] ......................................................... F16H 3/30
[52] U.S. Cl. .............................. 74/349; 74/445; 74/417; 74/457; 74/460; 74/461
[58] Field of Search ............................. 74/349, 347, 445, 74/417, 457, 460, 461, 406, 423; 476/51, 52

[56] References Cited

U.S. PATENT DOCUMENTS

| 844,203 | 2/1907 | Smith | 476/21 |
|---|---|---|---|
| 861,069 | 7/1907 | Wood | 476/22 |
| 886,911 | 5/1908 | Wolter | 476/16 |
| 887,961 | 5/1908 | Pfeiffer | 476/20 |
| 934,731 | 9/1909 | Jenkins | 476/22 |
| 994,037 | 5/1911 | Schwartz | 476/22 |
| 1,159,463 | 11/1915 | Barr et al. | 74/349 |
| 1,354,486 | 10/1920 | Jacques | 476/22 |
| 1,637,664 | 8/1927 | Stoeckicht | 476/53 |
| 1,868,676 | 7/1932 | Stoeckicht | 476/48 |
| 2,026,928 | 1/1936 | Back et al. | 474/69 |
| 2,875,628 | 3/1959 | Walter | 74/349 |
| 2,936,641 | 5/1960 | Voelkl | 74/349 |
| 2,970,494 | 2/1961 | Lynch | 74/336.5 |
| 3,018,668 | 1/1962 | Berquist | 74/393 |
| 3,175,410 | 3/1965 | Dittrich | 474/8 |
| 3,626,453 | 12/1971 | Riley | 476/51 |
| 3,894,439 | 7/1975 | Borello | 474/131 X |
| 4,183,253 | 1/1980 | Borello | 476/16 |
| 4,229,985 | 10/1980 | Borello | 476/53 |
| 4,448,087 | 5/1984 | Barzel | 476/51 |
| 4,680,985 | 7/1987 | Troester | 74/461 X |
| 4,708,912 | 11/1987 | Huppmann | 428/547 |
| 4,841,791 | 6/1989 | Lopez | 476/51 |
| 5,425,685 | 6/1995 | Park | 476/55 |
| 5,472,388 | 12/1995 | Lee et al. | 476/54 |

FOREIGN PATENT DOCUMENTS 1135629   11/1955   France .

Primary Examiner—Rodney H. Bonck
Assistant Examiner—Ankur Parekh
Attorney, Agent, or Firm—Rogers Law Office

[57] ABSTRACT

A continuously variable transmission (10) having input (12) and output (14) gearsets each having a pair of bevelled gears (16) rotatable about generally coplanar respective axes of rotation (22) and with the two bevelled faces (24) in a spaced-apart parallel relationship. The input (12) and output (14) gearsets are mounted opposite one another with the bevelled faces (24) aligned. A restorably deformable transfer ring is mounted between the input and output gearsets and a portion of the transfer ring (28) is captured between opposed teeth (24) of the bevelled gears (16). The transfer ring (28) is laterally moveable relative to the input (12) and output (14) gearsets. Rotation of the bevelled gears (16) of the input gearsets (12) deforms a transfer ring (28) and causes the transfer ring (28) to rotate about the transfer ring axis (42) and in turn impart motion to the bevelled gears (16) of the output gearset (14) in an amount determined by the relative lateral position of the transfer ring (28) and the input (12) and output (14) gearsets.

24 Claims, 16 Drawing Sheets

TRANSFER RING AND GEAR ARRANGEMENT FOR NON-SLIP CONTINUOUSLY VARIABLE TRANSMISSION

FIELD OF THE INVENTION

This invention relates to rotational coupling devices and more particularly to transmissions having drive ratios continuously variable between predetermined minimum and maximum amounts.

BACKGROUND

Many devices for providing rotational force such as internal combustion engines and electrical motors operate most efficiently over a range of rotational speeds (usually measured in revolutions per minute or "r.p.m.") that is relatively narrow. Many applications for such devices however require both rotational speeds outside of the range and incremental variations of speed.

Previously rotational speeds in applications for such devices have been controlled by controlling the speed of the device, interspersing a transmission having a few different fixed ratios between the device and a driven component or combinations of both.

A common example is an automobile where speed is controlled both by varying the speed of the engine and using a transmission or gearbox in which various "drive ratios" can be selected. The "drive ratio" is determined by the number of revolutions of an input shaft into the transmission required to cause one revolution of the output shaft.

The two most common automotive transmissions are manually selected transmissions and automatically selected transmissions. More modern manually selected transmissions of the type referred to as gears connectable to an input shaft which transmits rotational force to a corresponding number of gears connectable to an output shaft through a "cluster gear" comprising a corresponding number of gearsets cut into a single member. Selection of ratios in a manual transmission is achieved by locking selected gears to the input and output shafts, the remaining gears being free to rotate without transmitting rotational force.

Most modern automatic transmissions use a series of planetary gearsets each capable of two ratios depending on how the components of the gearsets are constrained to move by hydraulically activated friction clutches referred to as "bands".

Both manual and automatic transmissions are quite complex and expensive because of the requisite number of accurately machined and fitted components.

Despite advances made in automotive transmissions, they are generally limited to anywhere from three to five ratios by space and cost considerations usually requiring a combination of engine speed and gear selection to adequately control the speed and power requirements of the automobile. This results both in automobile engines often being operated out of their optimal r.p.m. range and an undesirable jerk resulting from the interruption and resumption of rotational coupling between the input and output shafts required to change from one combination of gearsets to another.

Various attempts have been made in the past to provide transmissions wherein the drive ratio is continuously and non-incrementally varied without requiring coupling and decoupling of various gearsets. These attempts have generally been based on a design first built by Messrs. Daimler and Benz in 1886.

The Daimler-Benz continuously variable transmission ("C.V.T.") which is illustrated as "FIG. 1" basically used a rubber V-belt 1 riding between two opposed pairs of shallow angle cones 2. Moving each pair of cones toward each other (as indicated by arrows 4) would cause the belt to ride "higher" on the cones and in effect run on a pulley of larger diameter. Moving the cones apart (as indicated by arrows 3) would cause the belt to run "lower" on the cones and in effect run on a pulley of smaller diameter. Simultaneously moving one pair of cones toward each other while moving the other pair of cones away from each other would vary the relative drive ratios between the pairs of cones.

A problem with the Daimler-Benz design is that attempts to transmit significant amounts of torque result in slippage of the belts.

The reason that many C.V.T. designs rely on the Daimler-Benz principle is that the V-belt frictionally engages the cones thereby avoiding any problems associated with requiring toothed components to continually mesh with each other or with a chain despite diametrical changes which would ordinarily cause variations in the pitch of the teeth. However the transmission of significant amounts of torque is better achieved by components which mesh rather than by frictionally coupled components.

SUMMARY OF THE INVENTION

A transfer ring comprising:

a guide mounted to a guide support structure, said guide being constrained to move about an endless path of generally fixed size and shape defined by said guide support structure;

a plurality of adjacent segments mounted within said guide, said guide interacting with said segments to allow said segments to be slidably displaced back and forth relative to each other in a first direction, said segments having opposite end faces which extend beyond said guide in said first direction;

stop means acting between said guide and said adjacent segments to limit said back and forth displacement;

constraining means to constrain said guide to move with said segments about said path;

said guide includes inner and outer members;

said constraining means extends between and rigidly connects said inner and outer members;

said adjacent segments are mounted between said inner and outer members;

said stop means includes a first component on each said segment which registers with a second component on said guide.

A no-slip continuously variable transmission comprising:

an input gearset;

a transfer ring meshing with said input gearset and receiving a rotational input from said input gearset;

an output gearset meshing with and receiving rotational input from said transfer ring;

said transfer ring includes a guide mounted in a guide support structure;

said guide is constrained to move about an endless path of generally fixed size and shape defined by said guide support structure;

a plurality of adjacent segments are mounted within said guide, said guide interacting with said segments to allow said segments to be slidably displaced back and forth relative to each other in first direction, said segments having opposite end faces which extend beyond said guide in said first direction, stop means acting between said guide and said adjacent segments to limit said back and forth displacement, and constraining means to constrain said guide to move with said segments about said path, said constraining means extending between and rigidly connecting an inner member of said guide and an outer member of said guide;

at least one of said input and output gearsets includes a pair of bevel gears mounted with adjacent toothed bevel faces in a generally parallel spaced apart relationship on opposite sides of said guide, said pair of bevel gears are rotationally coupled to rotate in equal amounts but in opposite directions relative to each other with the teeth of one bevel gear in said pair of bevel gears registering with the spaces between the teeth of the other bevel gear of said pair of bevel gears and said bevel gears are mounted so as to capture some of said segments of said transfer ring therebetween to cause said transfer ring and in turn said guide to move about said path; and said transfer ring is movable by a locator across said guide to vary the relative rotational speeds of said guide and said pair of bevel gears.

DESCRIPTION OF DRAWINGS

The invention is described below in more detail with reference to the accompanying drawings in which.

DESCRIPTION OF PREFERRED EMBODIMENTS

Figure 1:
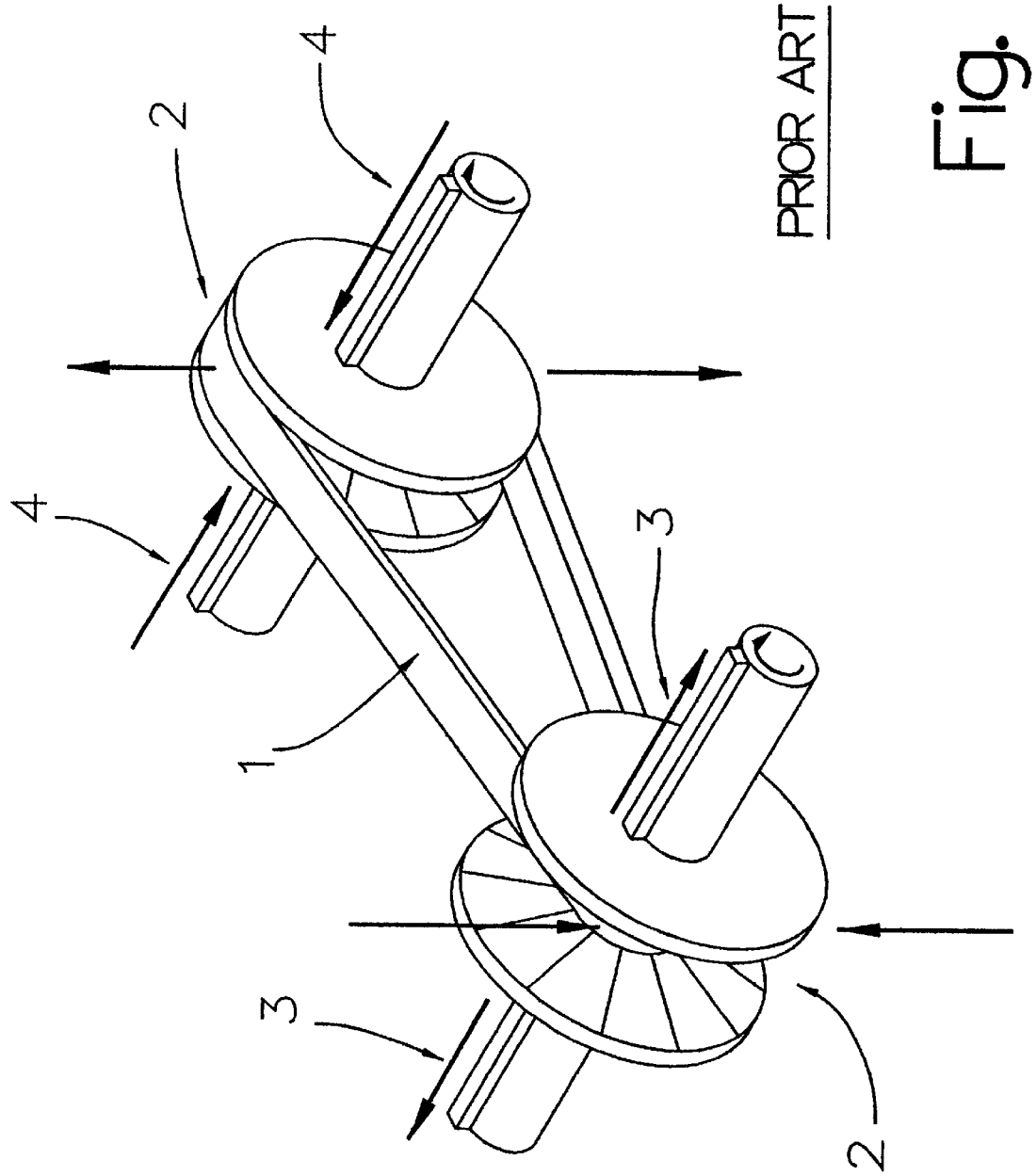
FIG. 1 is a perspective view of a "prior-art" C.V.T.
Figure 2:
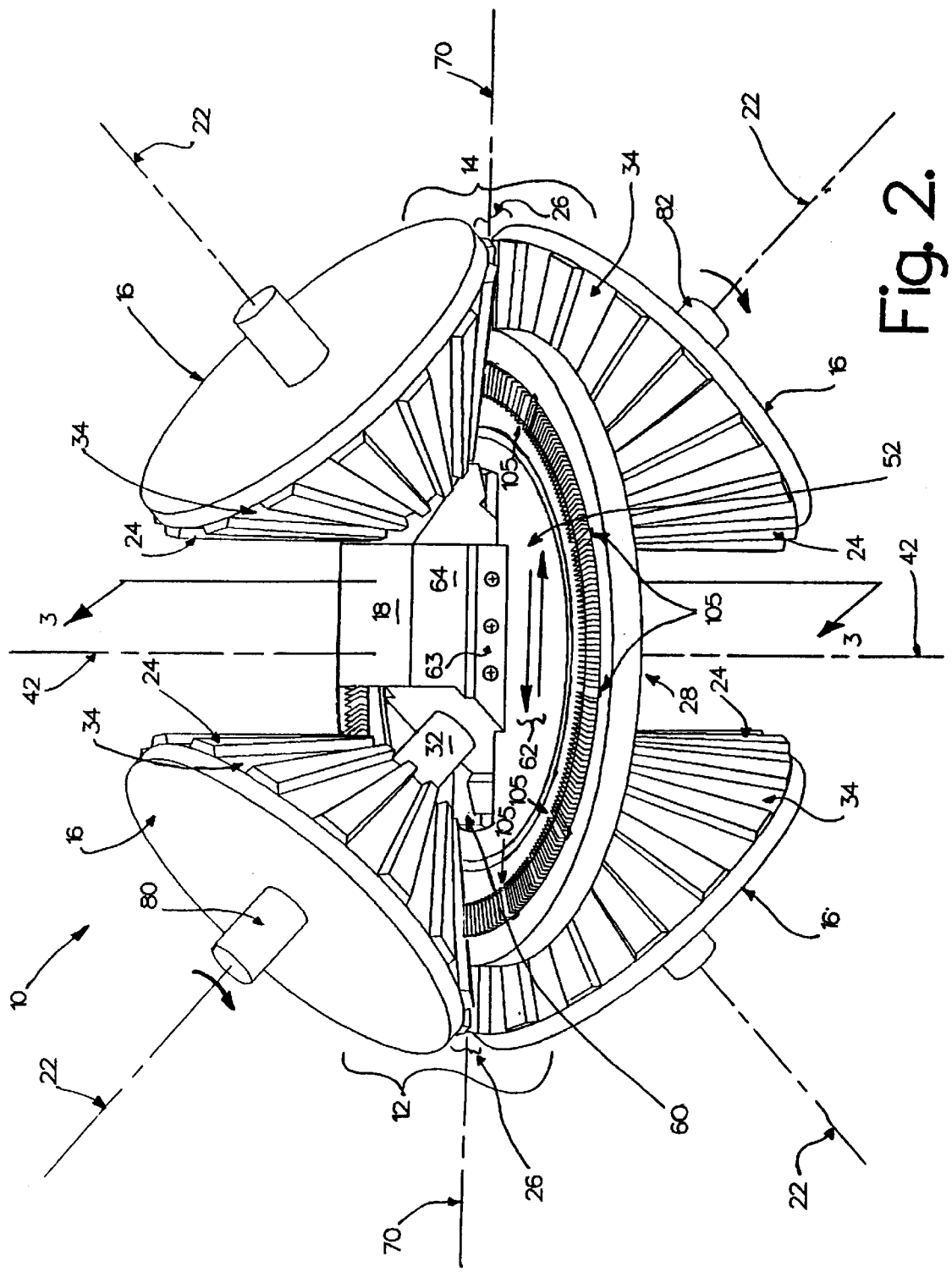
FIG. 2 is a perspective view of a C.V.T. according to the present invention.
Figure 3:
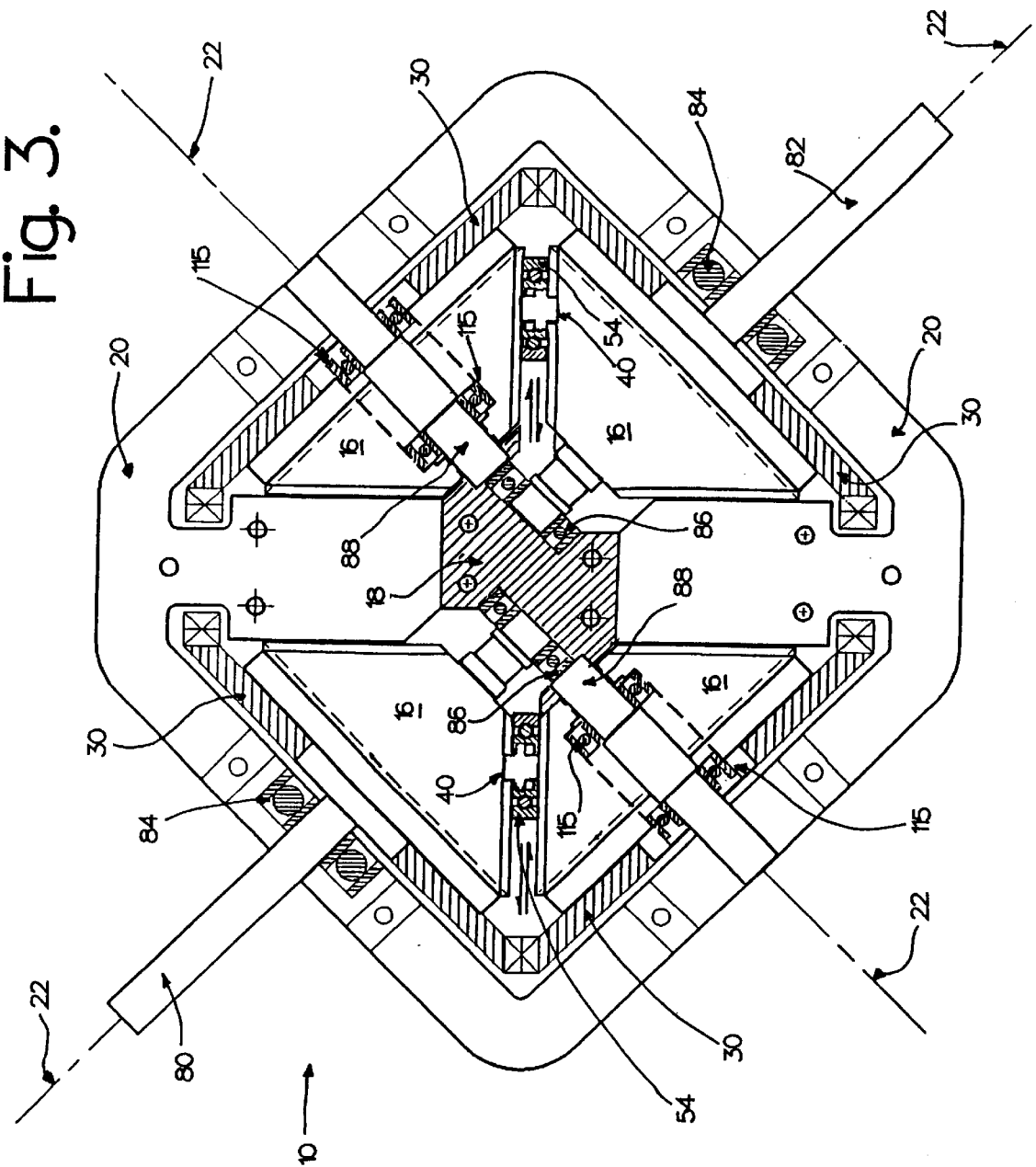
FIG. 3 is a section on line 3—3 of FIG. 2.

A C.V.T. according to the present invention is generally indicated by reference 10 in FIGS. 2 and 3. The C.V.T. 10 has an input gearset 12 to the left of FIG. 2 and an output gearset 14 to the right of FIG. 2. The input and output gearsets 12 and 14 respectively each include a pair of bevel gears 16.

Each of the bevel gears 16 is rotatably mounted at one end to a locator 18 described in more detail below and at the opposite end to a housing 20. Each of the bevel gears 16 is rotatable about a respective axis of rotation 22.

The bevel gears 16 are mounted with the axes of rotation 22 generally coplanar and with toothed bevelled faces 24 parallel and spaced apart to define a parallel-sided opening 26 between adjacent portions of the faces 24. The openings 26 are aligned to engage opposite ends of a generally disc-shaped transfer ring 28.

The pairs of bevel gears 16 in each of the input and output gearsets 12 and 14 respectively are rotationally coupled by bevel gears 30 and may be other than 90° in FIG. 3 which cause the bevel gears 16 of each gearset to rotate at equal amounts (i.e. equal angular velocities) but in opposite directions relative to each other.

The teeth 24 of each bevel gear 16 taper toward a narrower end 32 of the bevel gears 16. Between each of the teeth 24 are spaces 34 which correspond and are slightly larger in breadth than the teeth 24 so that the bevel gears 16 could mesh if they were not spaced apart by the breadth of the openings 26.

Figure 4:
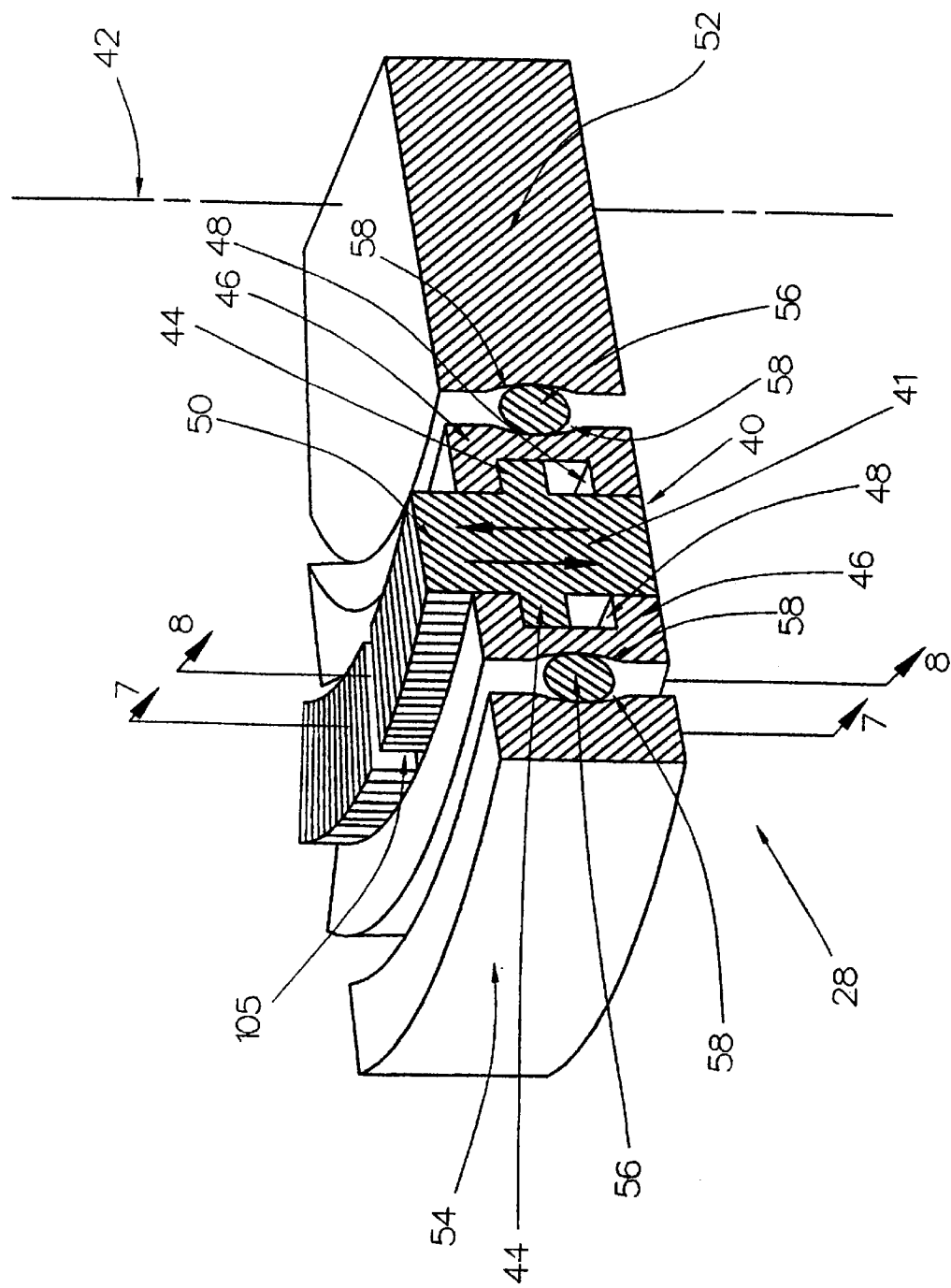
FIG. 4 is a perspective view showing the detail of a section of a transfer ring according to the present invention.

The structure of the transfer ring 28 is illustrated in detail in FIG. 4. The transfer ring 28 is of generally annular configuration and comprises a large number ("plurality") of adjacent segments 40 radially aligned with a transfer ring axis 42. Each segment 40 has a generally rectangular central portion 41 from opposite sides of which extend generally rectangular tabs 44. The segments 40 are mounted between opposed, annular channel shaped retention rings 46 with each of the tabs 44 extending into opposed channels 48 of the retention rings 46. The segments 40 are individually axially moveable or displaceable back and forth parallel to the transfer ring axis 42 in the directions illustrated by arrows 50. The retention rings 46 act as a guide for the segments 40. The end faces of the segments 40 extend beyond the retention rings 46.

Figure 8:
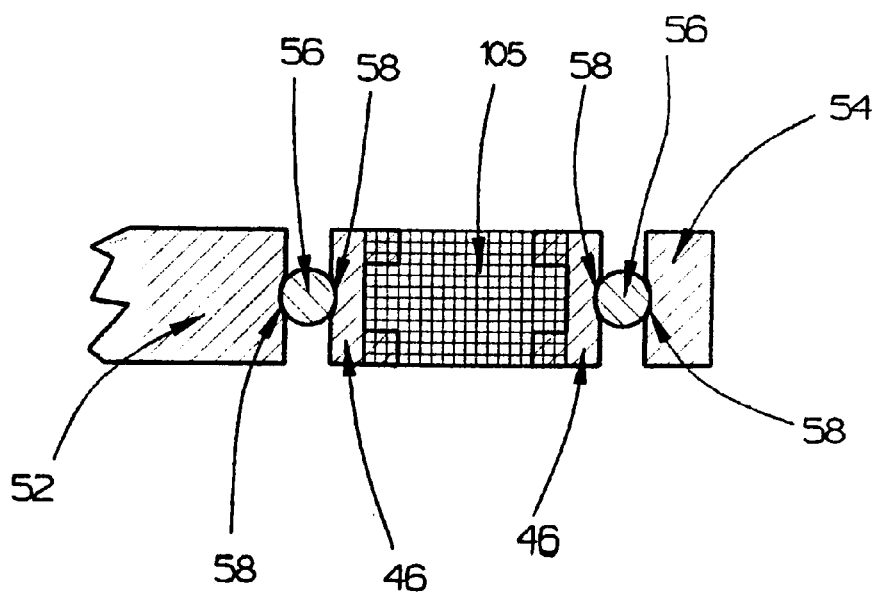
FIG. 8 is a section on line 8—8 of FIG. 4.

At spaced intervals, for example, every 30° along the circumference of the transfer ring 28, are fixed segments 105 act as constraining means to that transfer force from the axially moveable segments 40 to the annular channel shaped retention rings 46. The fixed segments 105 are rigidly secured to the retention rings 46, for example by welding, and do not project above the retention rings 46. FIG. 8 illustrates this configuration in more detail.

The sides of channels 48 interact with the tabs 44 to act as first and second stops or stop means to limit back and forth axial movement of the segments 42 to an amount predetermined by the breadth of the channels 48 and the height of the tabs 44.

The transfer ring 28 is mounted between a disc shaped inner transfer ring retaining member 52 which acts as a guide support structure and an annular outer transfer ring retaining member 54. Ball bearings 56 run in concave grooves 58 extending around the inner and outer perimeters of the retention rings 46, the outer transfer ring retaining member 54 and the inner transfer ring retaining member 52.

The ball bearings 56 extending around the outer perimeter of the retention rings 46 and the outer transfer ring retaining member 52 may be ommitted. The transfer ring 28 and the segments 40 are thereby constrained to rotate in an endless path about the transfer ring axis 42.

The locator 18 has a generally rectangular body extending through a generally rectangular slot 60 in the inner transfer ring retaining member 52 and is laterally moveable in the directions indicated by arrows 62 in FIG. 2. Generally rectangular restraining members 63 secured to opposite faces 64 of the locator 18 restrain the locator 18 from moving perpendicular to the inner transfer ring retaining member 52 in the direction of the transfer ring axis 42.

Opposed faces of the rectangular slot 60 through the inner transfer ring retention member 52 act against the faces 64 of the locator 18 to constrain the locator 18 to movement along the rectangular slot 60. The rectangular slot 60 has a slot axis 70 extending along its length. The slot axis 70, the transfer ring axis 42 and the axes of rotation 22 of the bevel gears 24 lie in the same plane.

As the input and output gearsets 12 and 14 respectively are mounted to the locator 18, relative lateral movement between the locator 18 and the inner transfer ring retention member 52 in the direction shown by arrows 62 will result in corresponding lateral movement of the transfer ring 28 relative to the bevel gears 16 along the opening 26.

Figure 6:
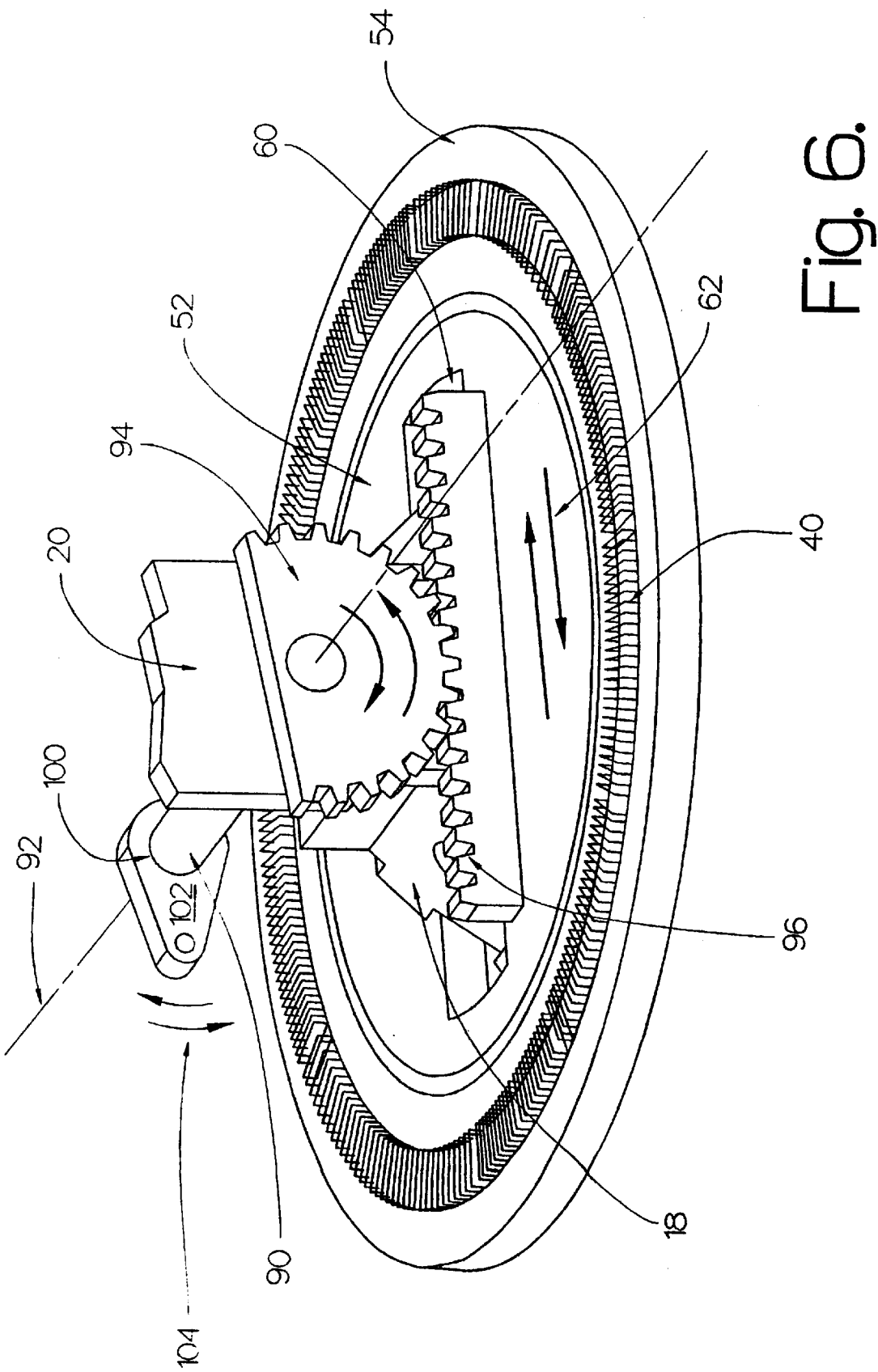
FIG. 6 is a perspective view of locator.
Figure 7:
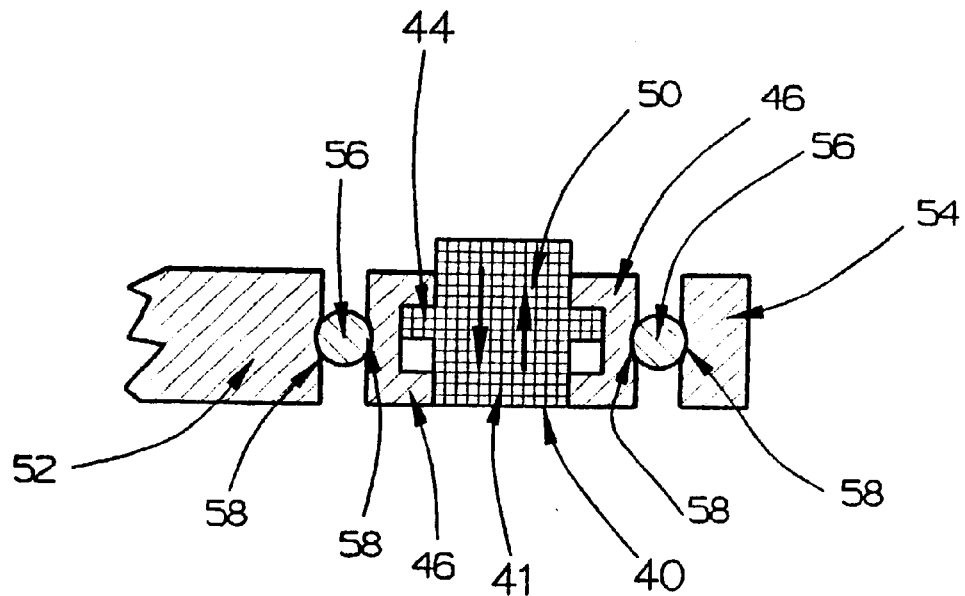
FIG. 7 is a section on line 7—7 of FIG. 4.

FIG. 6 illustrates one manner in which relative movement between the locator 18 and the inner transfer ring retention member may be achieved. The locator 18 is rigidly secured to the housing 20. A pinion shaft 90 extends through the housing 20 and is mounted so as to be constrained to rotate about a pinion shaft axis 92 generally coaxial with the pinion shaft 90. A pinion 94 is rigidly mounted to one end of the pinion shaft 90 and rotatable with the pinion shaft 90 about the pinion axis 92.

A rack 96 is rigidly mounted to the inner transfer ring retention member 52 adjacent to the rectangular opening 60 and generally parallel to the slot axis 70. The pinion 94 engages the rack 96.

The opposite end 100 of the pinion shaft 90 extends through the housing 20 and a crank 102 extends generally radially therefrom and is rigidly secured thereto. Rotation of the crank 102 in the direction of arrows 104 will cause a corresponding rotation of the pinion shaft 90 and accordingly will rotate the pinion 94 about the pinion shaft axis 92. Rotation of the pinion 94 will cause the rack 96 to move laterally and in turn cause the inner transfer ring retention member 52 to move relative to the locator 18 in the direction of arrows 62.

Other means to cause relative movement between the locator 18 and the inner transfer ring retention member would no doubt be apparent to one skilled in the art. For example a hydraulic cylinder may be mounted between the locator 18 and the inner transfer ring retention member 52.

Figure 5:
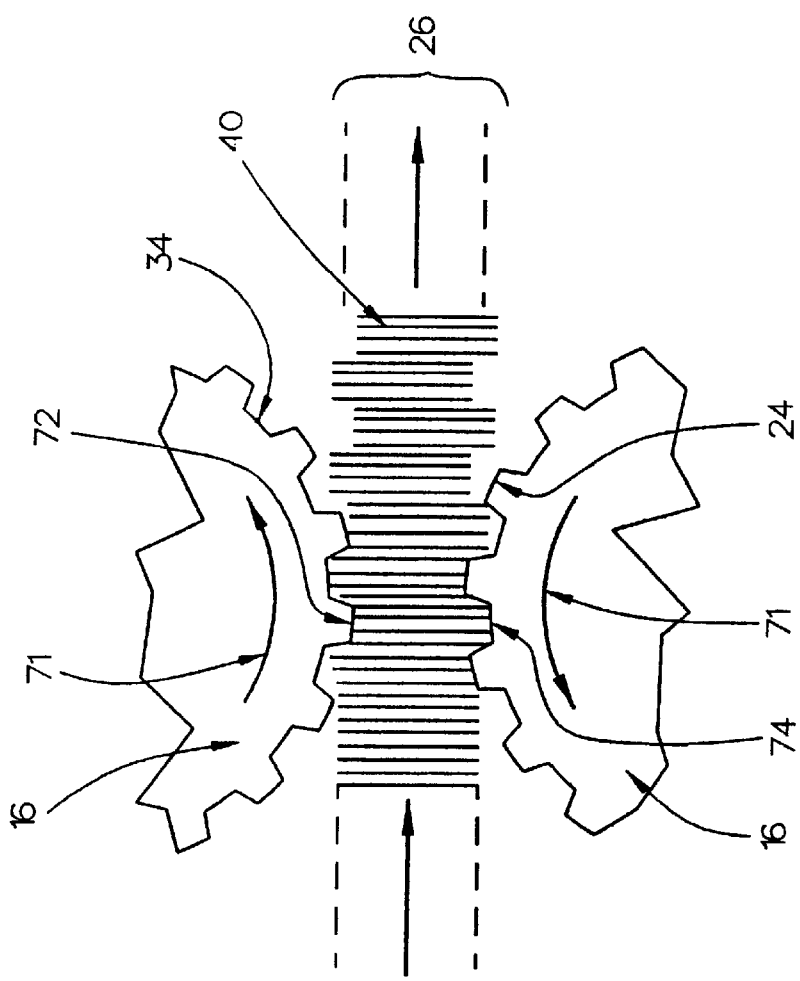
FIG. 5 is a partial sectional view illustrating the interrelationship between a transfer ring and a gearset according to the present invention.

Reference is now made to FIG. 5 which illustrates the interrelationship between the pairs of bevel gears 16 of each of the input and output gearsets (12 and 14 respectively in FIGS. 2 and 3) and the transfer ring segments 40. The bevel gears 16 are arranged so that as they rotate relative to each other in the directions shown by arrows 71, each of the teeth 24 of one of the pairs of bevel gears 16 lines up in turn with one of the spaces 34 between the teeth 24 of the opposite bevel gear. In other words the adjacent bevel gears 16 would mesh were it not for the openings 26 resulting from the parallel spaced apart relationship of each pair of bevel gears 16.

The gap between a tip 72 of a tooth 24 of one of the bevel gears 16 and a base 74 of the corresponding space 34 of the opposite of the bevel gears 16 generally accords with the height of the rectangular central portion 41 of the segments 40. The depth of the spaces 34 (i.e. the height of the teeth 24) should correspond to the predetermined amount of axial movement of the segments 40. Accordingly as the pair of bevel gears 16 rotate, the teeth 24 of one of the bevel gears 16 will axially displace certain of the segments 40 in the direction indicated by arrows 50 into the opposed space 34 thereby causing the portion of the transfer ring 28 trapped there between to conform to the shape of the space defined between adjacent portions of the bevel gears 16. In a sense therefore the bevel gears 16 form temporary "teeth" in the transfer ring 28 as the transfer ring 28 passes between them thereby effecting a mechanical rather than a frictional transfer of force.

It will be appreciated therefore that rotation of the input gearset 12 about the axes of rotation 22 will cause the transfer ring 28 to rotate about the transfer ring axis 42 and in turn cause rotation of the output gearset 14 about respective axes of rotation 22.

As the input and output gearsets 12 and 14 respectively include bevel gears 16, the amount of movement imparted by the input gearset 12 on the output gearset 14 will be determined by the position of the input and output gearsets, 12 and 14 respectively, and the transfer ring 28.

As illustrated in FIG. 2, the transfer ring 28 runs between the narrower end 32 of the bevel gears 16 of the input gearset 12 and the broader end of the bevel gears 16 of the output gearset 14. This results in a gear reduction and corresponding torque multiplication. If the input and output gearsets 12 and 14 were moved to the right as illustrated in FIG. 2 by moving the locator 18 to the right relative to the transfer ring 28, the amount of reduction would diminish and as the extreme right is approached would result in a torque reduction and corresponding angular velocity multiplication.

Various means of transferring rotational motion into the input gearset 12 and out of the output gearset 14 may be used. The method illustrated in FIG. 2 uses an input shaft 80 connected to and coaxial with one of the bevel gears 16 of the input gearset. An output shaft 82 is connected to and coaxial with one of the bevel gears 16 of the output gearset 14.

The input shaft 80 and output shaft 82 are constrained to rotate about their respective axes of rotation 22 by bearings 84 mounted to the housing 20 and bearings 86 in the locator 18.

The remaining bevel gears 16 are mounted on shafts 88 extending between the locator 18 and the housing 20. Bearings 115 locate the bevel gears 16 on shafts 88 and constrain the bevel gears 16 to rotate about their respective axes of rotation 22.

As mentioned above, the teeth 24 and spaces 34 of the bevel gears 16 are tapered in that they narrow toward the narrower end of the bevel gears 16. Accordingly the number of segments 40 of the transfer ring 28 trapped in the space between opposed teeth 24 and spaces 34 would vary depending on the breadth of the portion of the teeth 24 and spaces 34 adjacent to the trapped segments 40.

In order for the segments 40 to lie with adjacent faces abutting the segments 40 taper inwardly when viewed from above toward the transfer ring axis 42. The tapering of the segments 40 enables the tangential load imparted by the input and output gearsets 12 and 14 respectively to be spread over the entire adjacent faces of the segments 40 thereby maximizing the robustness of the unit and minimizing wear.

It will be appreciated that one of the key elements of the present invention is a transfer ring with movable segments that acts as a continually re-formable gear having a variable pitch. The bevel gears act as variable diameter and pitch gears as they are moved across the transfer ring to provide torque multiplication or reduction with a respectively associated speed reduction or multiplication.

What has been described above is one particular embodiment of a transfer ring and a C.V.T. utilizing such a transfer ring in association with movable bevel gearsets. The basic components of the present invention may however be varied considerably while staying within the scope of the present invention. By way of example. some of the various modifications to component structure and layout are described below.

Figure 9:
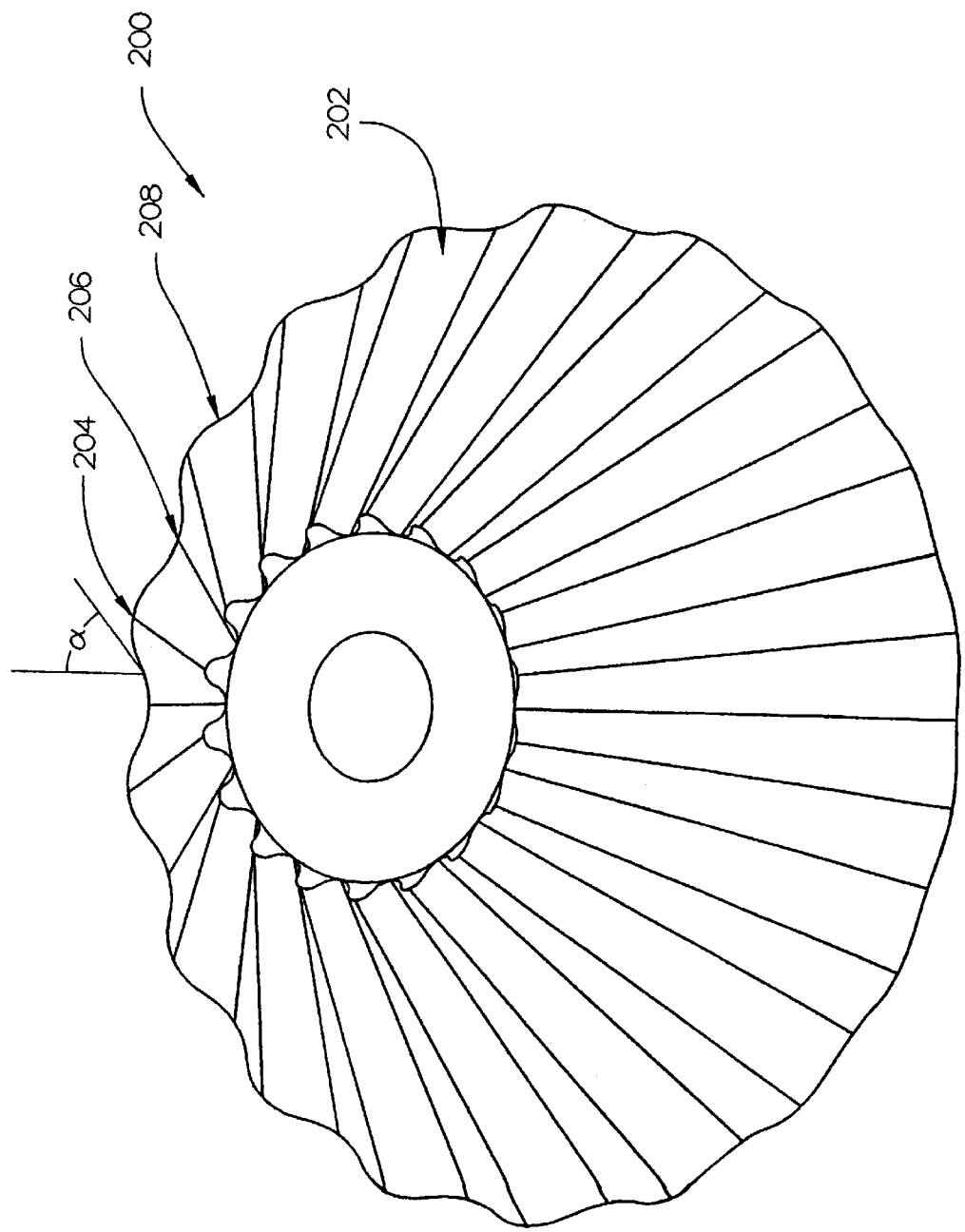
FIG. 9 is a perspective view of a bevel gear having cycloidal splines.

FIG. 9 illustrates a bevel gear 200 or "torque cone" having a contact surface 202 with a cycloidal geometry. Such a geometry improves contact between the transfer ring and the contact surface 202 by eliminating edges. The breadth of the ridges 204 and recesses 206 which make up the contact surface 202 vary along the length of the contact surface 202, however the overall height or depth is kept constant across the contact surface 202. The angle defined between the segments and a tangent to a mid-point 208 between the ridges 204 and recesses 206 should be kept smaller than 60° to avoid slippage. The angle is illustrated as α and referred to in the claims below as the "mid-height contact angle".

A disadvantage to using a pair of bevel gears as an output gearset is that the deformation of the transfer ring must take place under the load imparted by the input gearset. In contrast, the deformation of the transfer ring by the input gearset takes place in a substantially unloaded condition. Frictional losses and inter-segment wear may arise from the deformation of the transfer ring under load.

It may therefore be desirable to provide an output gearset which does not mesh with the segments of the transfer ring.

Figure 10:
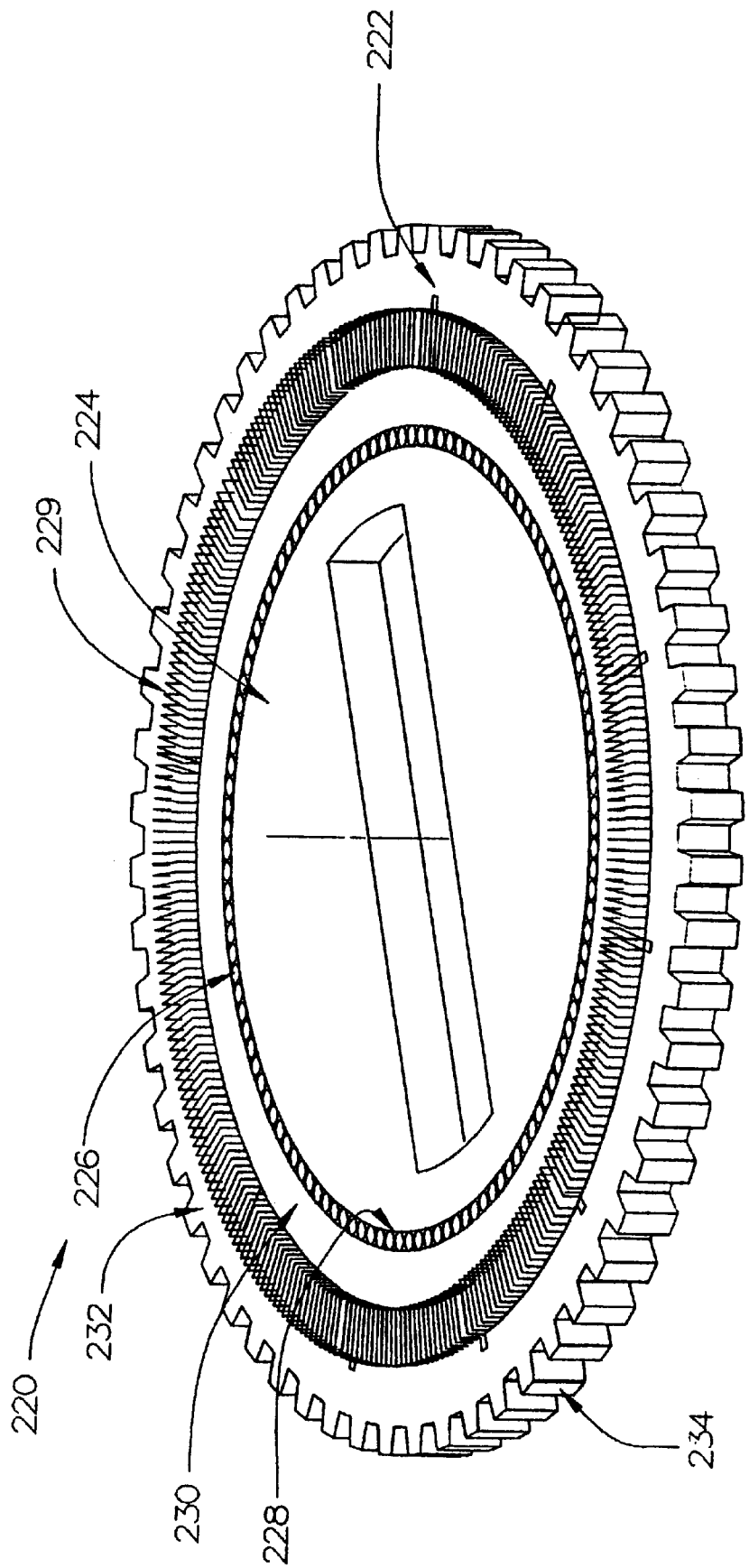
FIG. 10 is a perspective view of a transfer ring having a ring gear extending around it.

FIG. 10 illustrates an alternate embodiment transfer ring 220 having a guide 222 mounted to a guide support structure 224 and constrained by its shape and bearings 226 to move about a circular path defined by an outer face 228 of the guide support structure. A plurality (i.e. a large number of) relatively thin adjacent segments 229 are mounted between inner and outer members, 230 and 232 respectively, of the guide 222 in much the same manner as illustrated in FIG. 4.

Unlike the FIG. 4 embodiment, there is no outer transfer ring retaining member 54 separated from the guide by an outer race of bearings 56. In contrast, the outer guide member 232 of the FIG. 10 embodiment is provided with a ring gear 234 extending radially about it and constrained to rotate with it. In the illustration the teeth of the ring gear 234 are formed into the outer guide member 232 however it is conceivable that they be separate parts.

Figure 11:
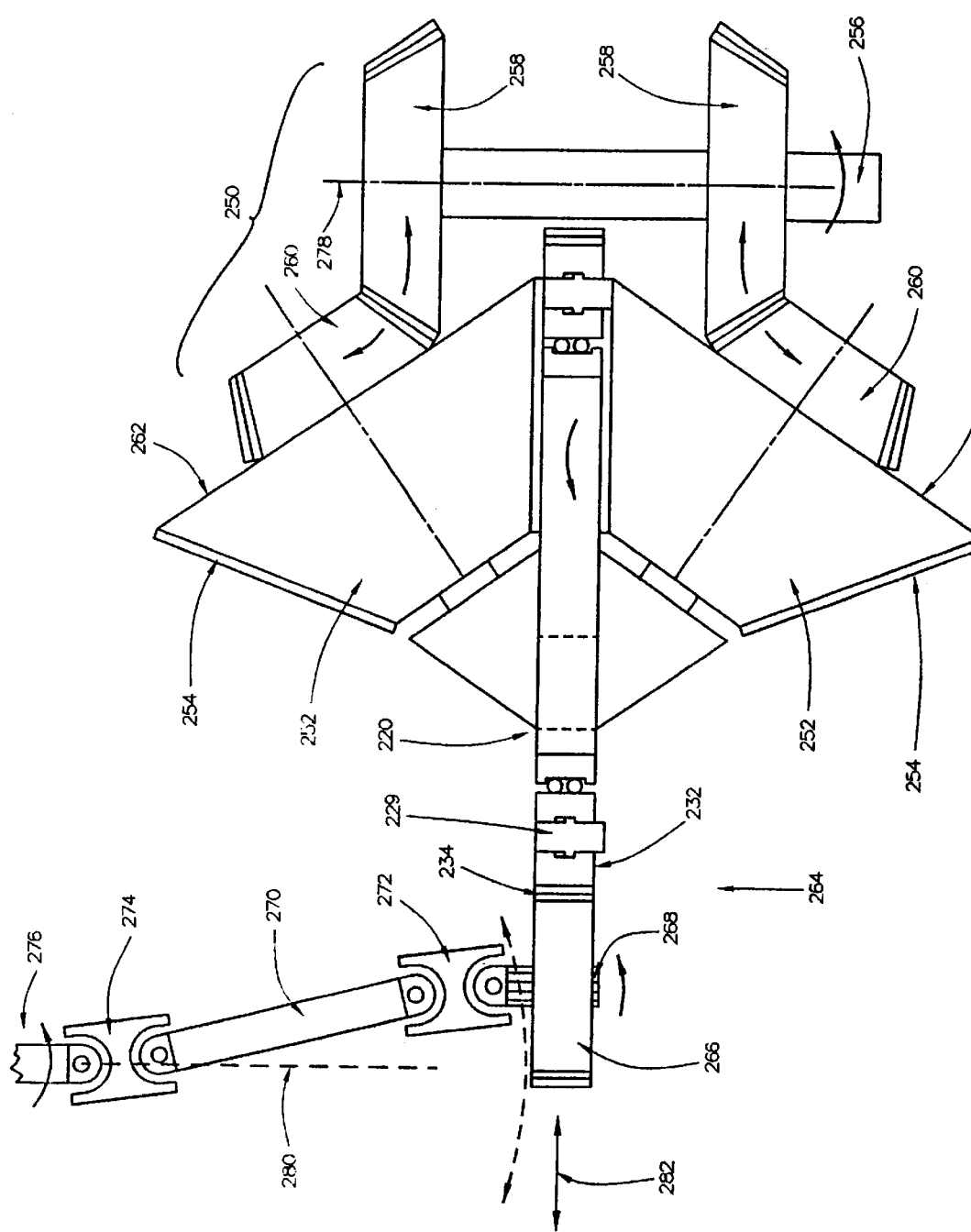
FIG. 11 is a schematic view of an alternate embodiment of a no-slip C.V.T. according to the present invention.
Figure 12:
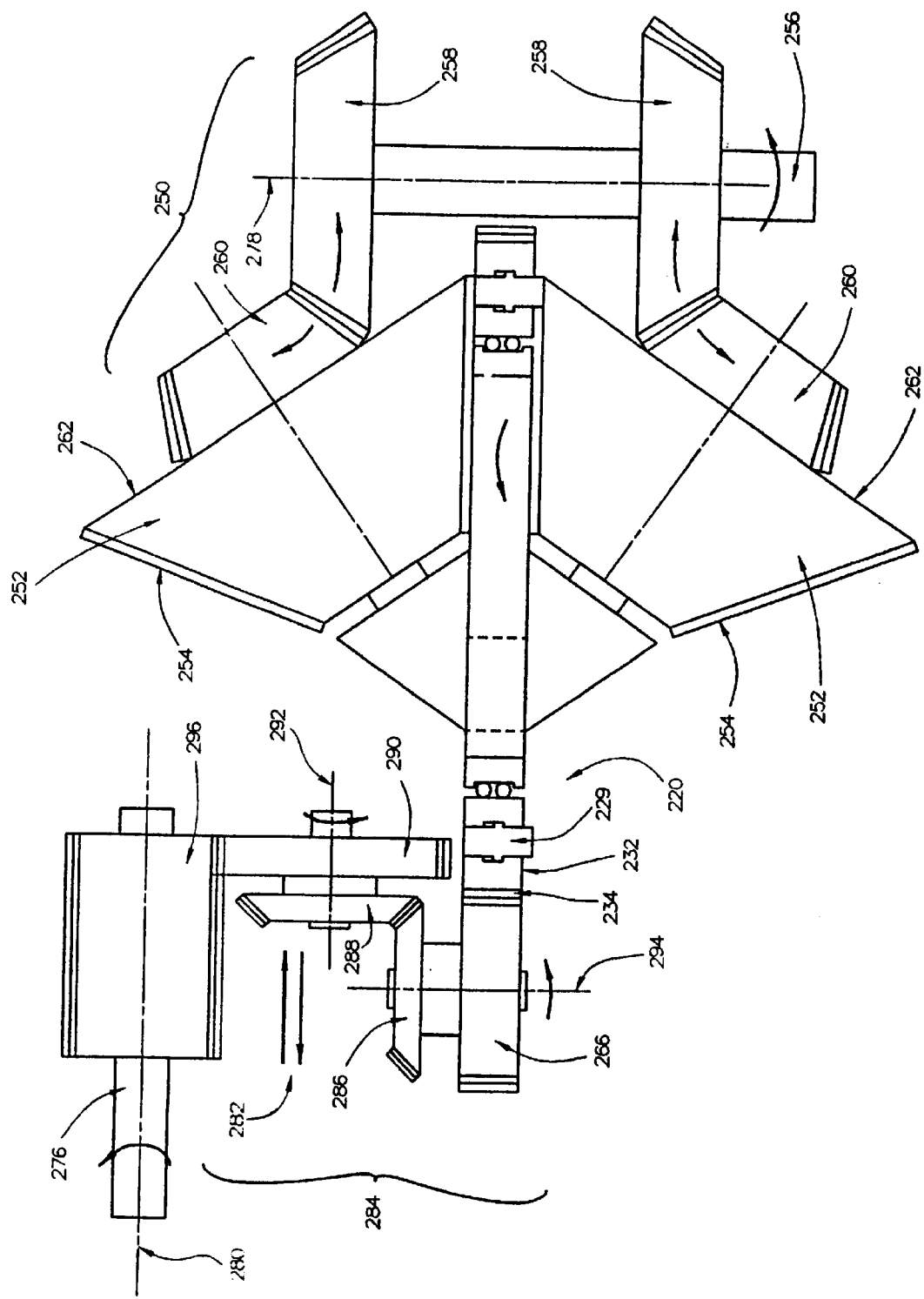
FIG. 12 is a schematic view of another alternate embodiment of a no-slip C.V.T. according to the present invention.
Figure 13:
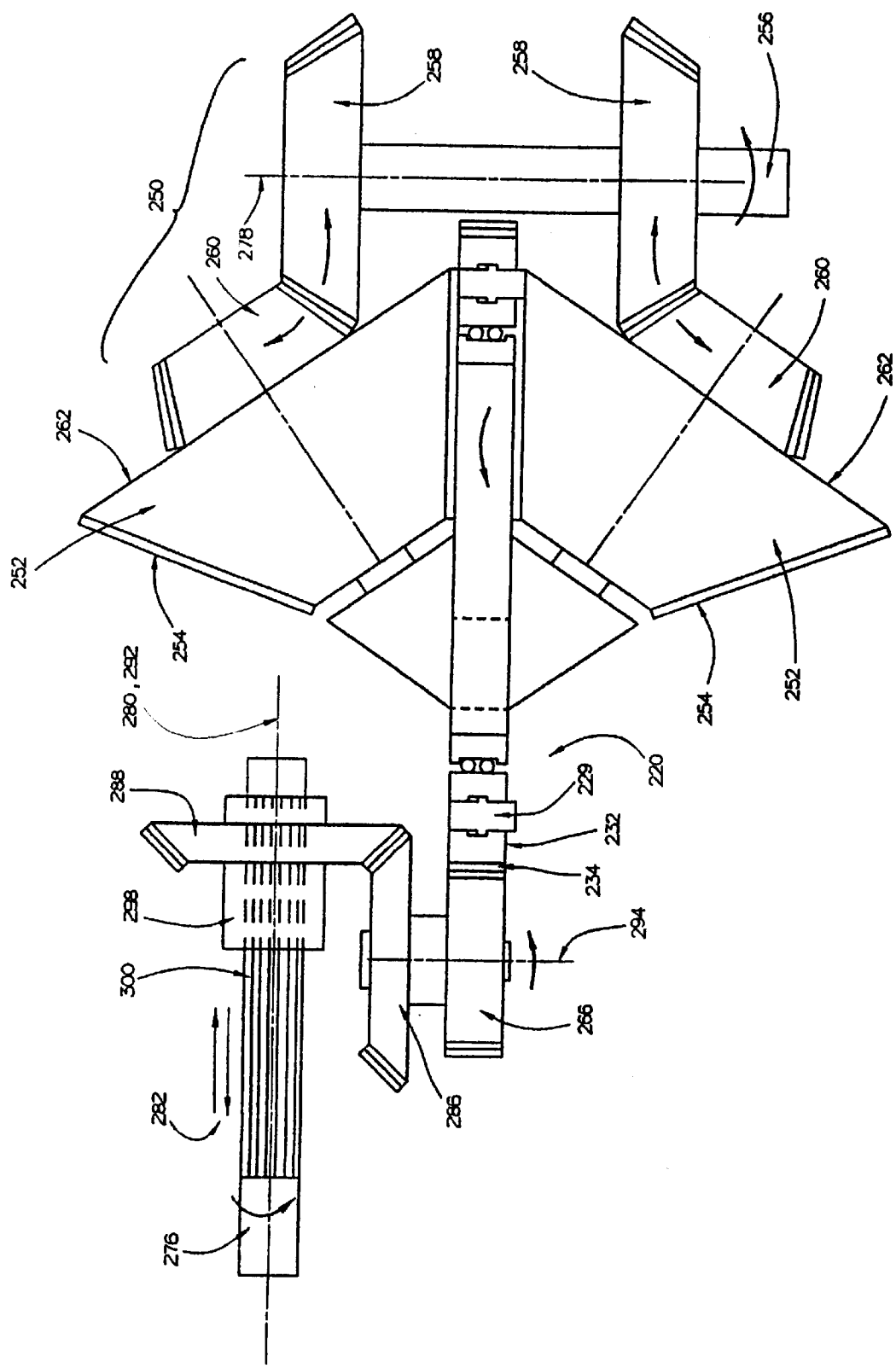
FIG. 13 is a schematic view of yet another alternate embodiment of a no-slip C.V.T. according to the present invention.

The ring gear 234 forms part of an output gearset which may vary in arrangement as illustrated in FIGS. 11, 12 and 13.

FIG. 11 illustrates a C.V.T. having a gearset 250, which will herein be described as an input gearset 250, however one should appreciate that the gearset 250 may alternatively (although not as desirably) be used as an output gearset. The input gearset 250 includes a pair of bevel gears 252 mounted with toothed faces 254 parallel and on opposite sides of a transfer ring 220 of the type described above and illustrated in FIG. 10.

Torque input is received from an input shaft 256 and transferred to the bevel gears 252 by a pair of bevelled transfer gears 258 which are constrained to rotate together and mesh with corresponding bevelled transfer gears 260 extending from rear faces 262 of the bevel gears 252.

The C.V.T. of FIG. 11 has an output gearset 264 which essentially comprises a pinion gear 266 that meshes with the ring gear 234 and has a splined hub which slidably engages a splined shaft 268. The splined shaft 268 is rotationally coupled to an intermediate shaft 270 by a first constant velocity joint 272. A second constant velocity joint 274 connects the intermediate shaft to an output shaft 276.

The output arrangement illustrated in FIG. 11 enables the transfer ring 220 to be moved with the input shaft 256 and output shaft 276 to have fixed respective axes of rotation 278 and 280 while enabling the transfer ring 220 and pinion gear 266 to move relative to the bevel gears 252 in the direction of arrows 282. It is expected that elimination of a bevel gear output gearset arrangement reduces gear forming forces on the transfer ring by about 70 per cent.

FIGS. 12 and 13 illustrate output arrangements which eliminate the constant velocity joints 272 and 274 in the FIG. 11 arrangement.

FIG. 12 illustrates an output gearset 284 which includes a pinion gear 266 meshing with the ring gear 234. The pinion gear 266 is coupled to and rotates with a first bevel gear 286. The first bevel gear 286 meshes with and rotates a second bevel gear 288. The second bevel gear 288 is coupled to and rotates with a second pinion gear 290 about an axis 292 generally perpendicular to an axis of rotation 294 of the pinion gear 266. The second pinion gear 290 meshes with an is slidable along an output shaft gear 296. The transfer ring 220, ring gear 234, pinion gear 266, first and second bevel gears, 286 and 288 respectively, and the second pinion gear 290 are movable in unison relative to the input gearset 250 and output shaft gear 296 in the direction of arrows 282.

FIG. 13 illustrates an embodiment similar in many respects to the FIG. 12 embodiment differing in that the output shaft 276 is driven by the second bevel gear 288. The second bevel gear is provided with a splined hub 298 slidably engaging corresponding splines 300 on the output shaft 276. The transfer ring 220, ring gear 234, pinion gear 266, first bevel gear 286 and second bevel gear 288 are movable in unison relative to the input gearset 250 and splined output shaft 276 in the direction of arrows 282.

Figure 14:
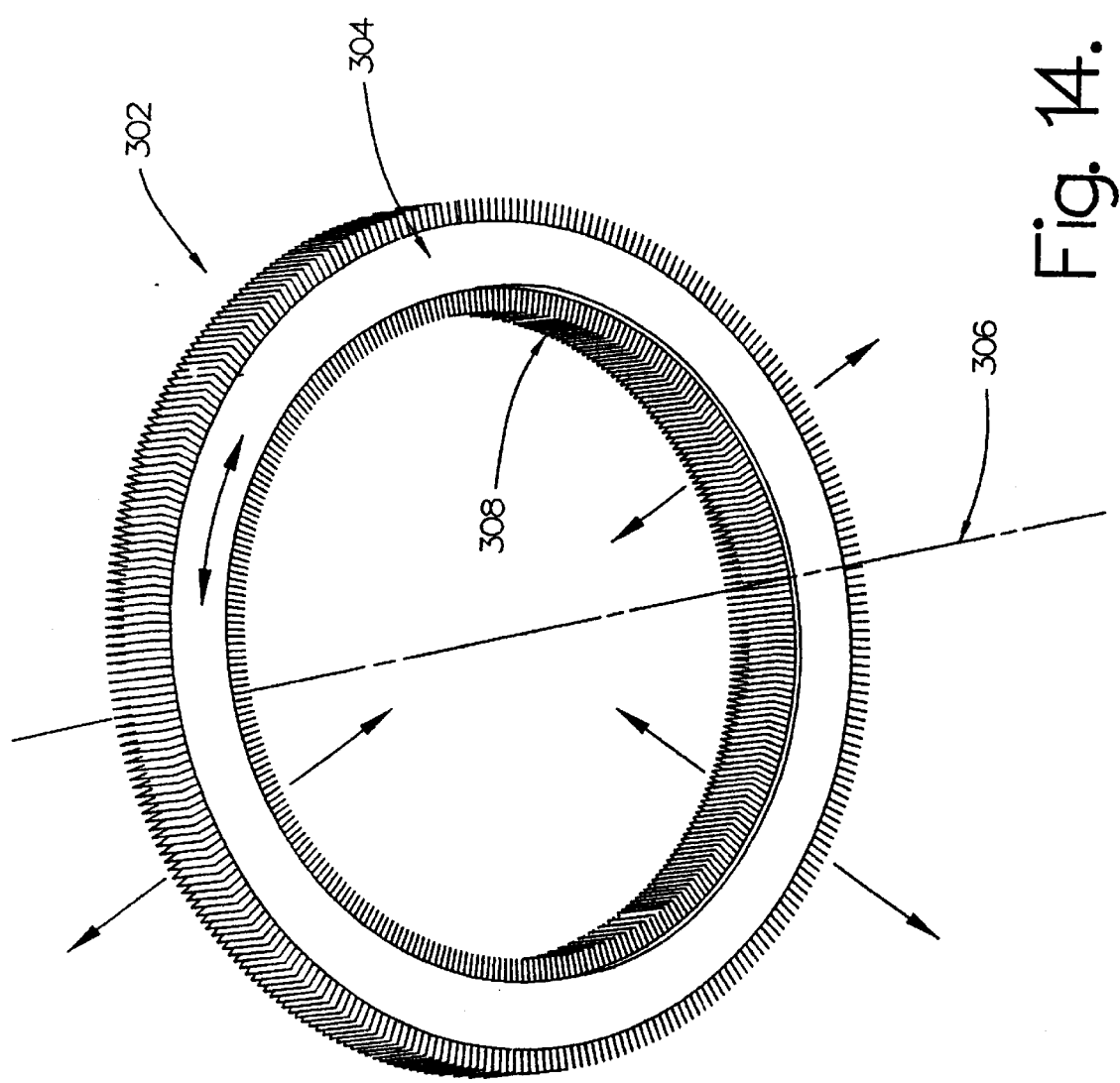
FIG. 14 is a perspective view of an alternate embodiment of a transfer ring according to the present invention.

Other arrangements for the transfer ring may also be possible. FIG. 14 illustrates a transfer ring 302 having guide 304 which moves in a generally circular path about an axis 306. Segments 308 are mounted so as to move back and forth radially relative to the axis 306.

Figure 15:
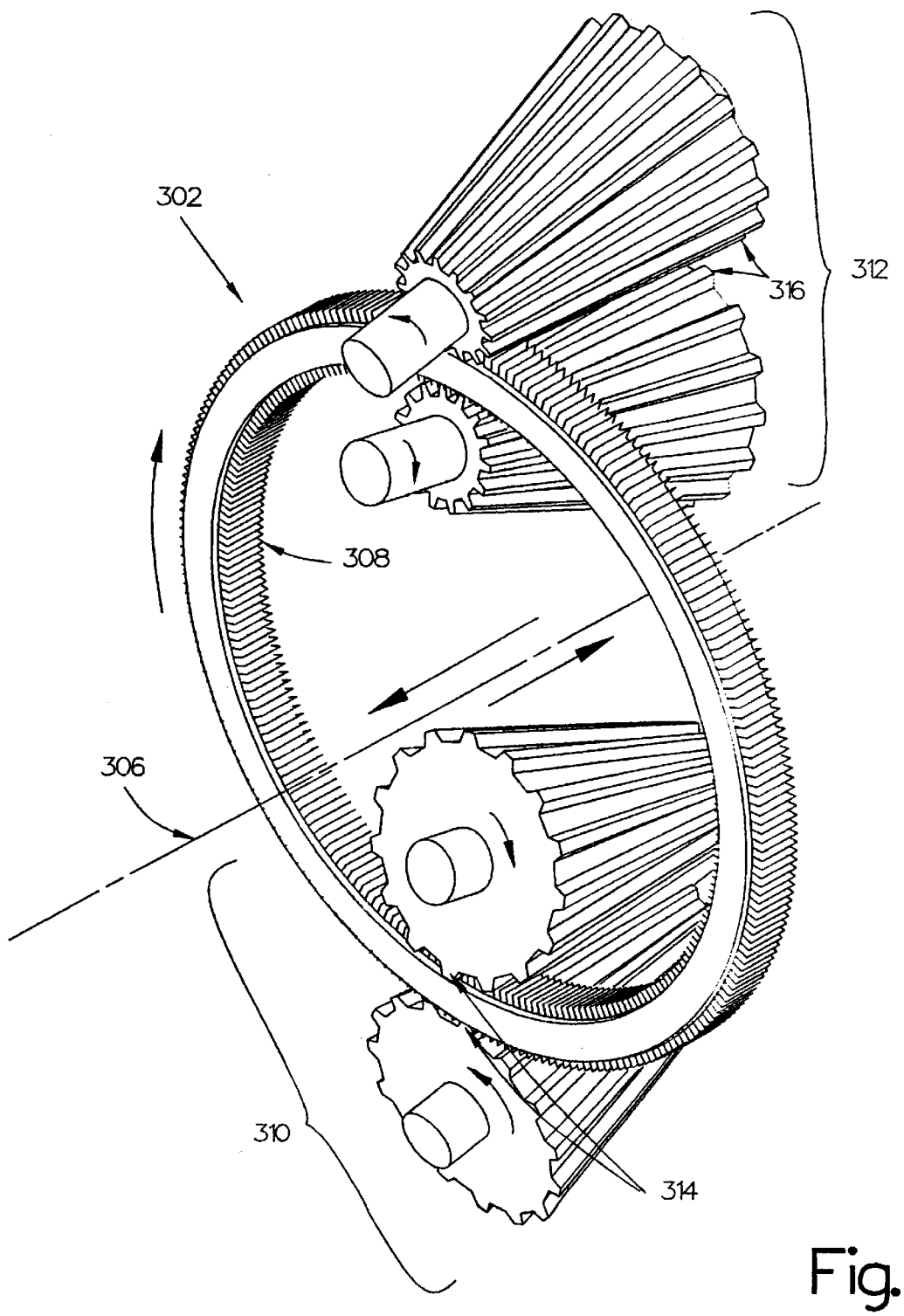
FIG. 15 is a perspective view of a non-slip C.V.T. according to the present invention embodying a transfer ring of the type illustrated in FIG. 14.

FIG. 15 illustrates part of a C.V.T. utilizing a transfer ring 302 as described above with respect to FIG. 14. The principle of operation is generally the same as for the previously described C.V.T. arrangements with the principal difference being that input gearset 310 and output gearset 312 are arranged with generally parallel opposing faces, 314 and 316 respectively, generally parallel to the axis 306 rather than radial to that axis.

A disadvantage to the FIG. 15 arrangement is that the segments 308 tend to be moved toward each other as they are moved radially inwardly and to be moved apart as they are moved radially outwardly. Accordingly segment shape and inter-segment spacing may be problematical. An advantage to the FIG. 15 embodiment is that the segments 308 would tend to be hurled radially outwardly by centrifugal force. It may be possible to take advantage of this at high rotational speed to eliminate the inner bevel gear from the input gearset 310 and output gearset 312.

Figure 16:
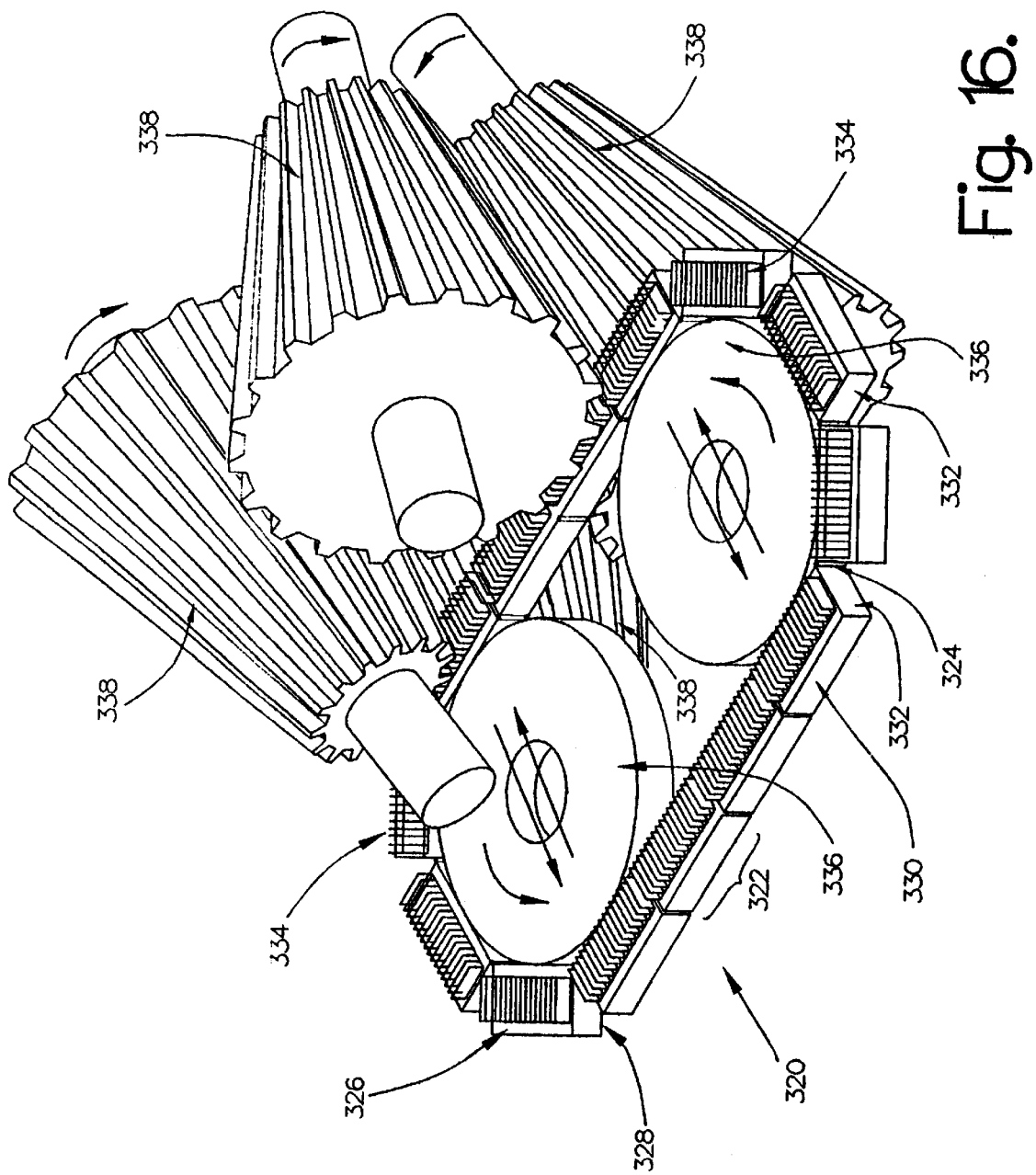
FIG. 16 is a perspective view of a no-slip C.V.T. according to the present invention having a further alternate embodiment transfer ring arrangement.

In all of the above embodiments, the transfer ring has had a rigid guide which moves about a circular path. FIGS. 16 and 17 illustrate a transfer ring arrangement in which a guide 320 is made up of a plurality of generally rectangular cassettes 322 which may either push each other in a generally oval path or be linked or hingedly connected to pull each other around the path. A typical hinge is shown at reference 324.

Each of the cassettes 322 has open top and bottom faces, 326 and 328 respectively, and closed side and end faces 330 and 332 respectively. Each cassette 322 contains a plurality of adjacent segments 334. In this arrangement the end faces 332 of the cassettes 322 act as constraining means to cause the guide 320 to move with the segments 334.

The guide is supported on the inside by a pair of cylindrical guide wheels 336 which comprise at least part of a guide support structure and in the linked cassette arrangement may comprise the entire guide support structure. If the cassettes are not linked, an outer track or guide (not illustrated) will have to be provided. The hinge 324 may form part of the guide support structure in arrangements where the cassettes 322 are being pushed rather than pulled.

Figure 17:
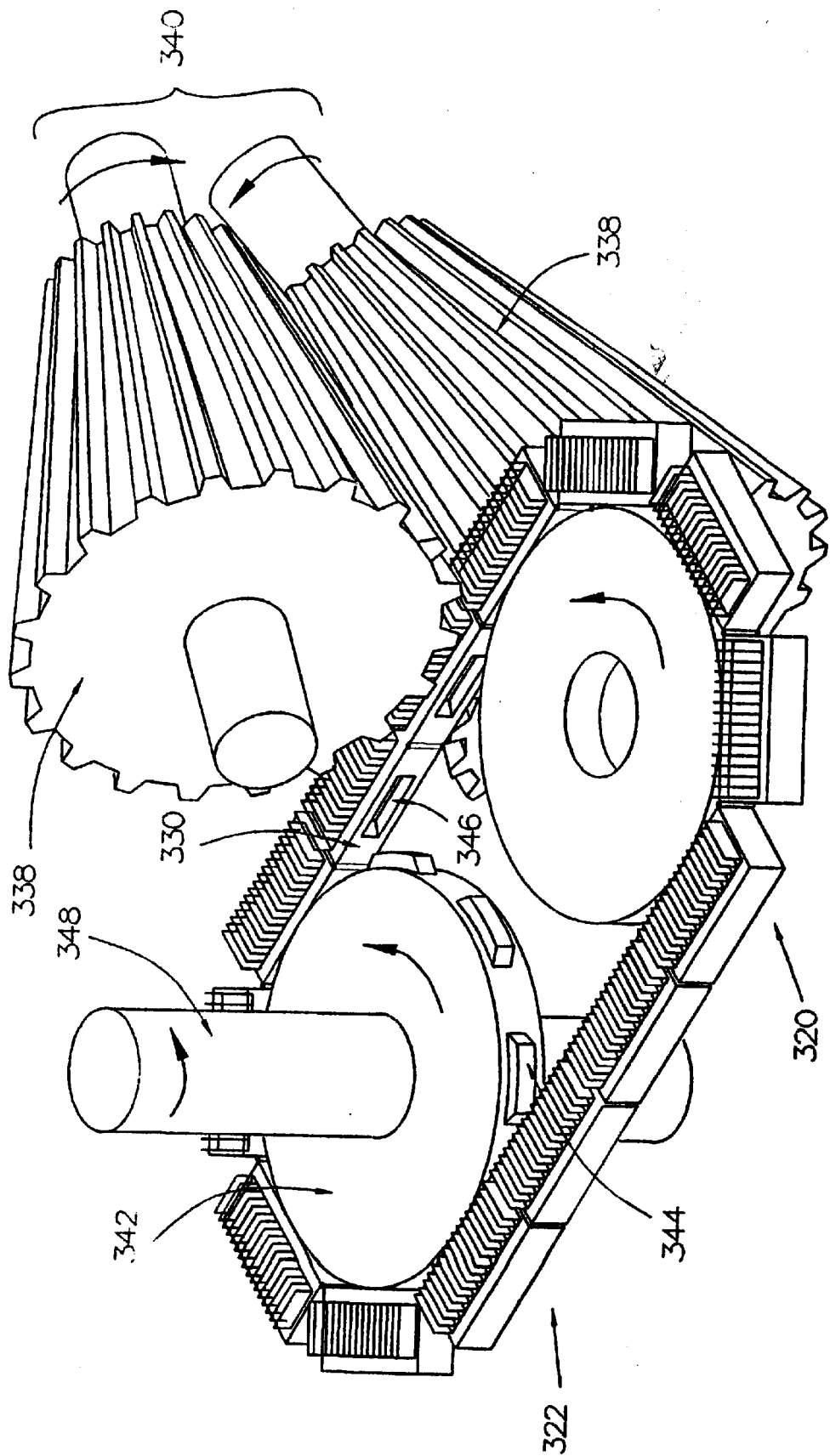
FIG. 17 is a perspective view of a further alternate embodiment of a no-slip C.V.T. according to the present invention.

FIG. 16 illustrates the use of paired bevel gears 338 for both the input gearset and output gearset. FIG. 17 illustrates the use of paired bevel gears 338 for an input gearset 340. The output "gearset", which might more properly be regarded as a sprocket includes a cylindrical toothed wheel 342 having radially extending teeth 344. The teeth 344 register and mesh with similarly profiled recesses 346 in the inside side faces 330 of the cassettes 322. The toothed wheel 342 is mounted on an output shaft 348 and transfers movement from the guide 320 to the output shaft 348.

The above description is intended in an illustrative rather than a restrictive sense. Variations to the specific structure described may be apparent to appropriately skilled persons while remaining within the spirit and scope of the invention as defined by the claims set out below.

What is claimed is:

1. A transfer ring comprising:
    a guide mounted to a guide support structure, said guide being constrained to move about an endless path of generally fixed size and shape defined by said guide support structure;
    a plurality of adjacent segments mounted within said guide, said guide interacting with said segments to allow said segments to be slidably displaced back and forth relative to each other in a first direction, said segments having opposite end faces which extend beyond said guide in said first direction;
    stop means acting between said guide and said adjacent segments to limit said back and forth displacement;
    constraining means to constrain said guide to move with said segments about said path;
    said guide includes inner and outer members;
    said constraining means extends between and rigidly connects said inner and outer members;
    said adjacent segments are mounted between said inner and outer members;
    said stop means includes a first component on each of said adjacent segments which registers with a second component on said guide.
2. A transfer ring as claimed in claim 1 wherein bearings are interspersed between said guide and said guide support structure to mount said guide in said guide support structure and minimize friction between said guide and said guide support structure.
3. A transfer ring as claimed in claim 1 wherein one of said first component and said second component is a projection and the other of said first component and said second component is a recess.
4. A transfer ring as claimed in claim 1 wherein:
    said guide comprises a series of cassettes, each cassette having open top and bottom faces and closed side and end faces;
    each cassette contains a plurality of said adjacent segments; and
    said end faces of said cassettes act as said constraining means.
5. A transfer ring as claimed in claim 4 wherein said cassettes are arranged end to end in a continuous carousel in which movement of any of said cassettes is transmitted by pushing to an adjacent of said cassettes.
6. A transfer ring as claimed in claim 4 wherein said cassettes are linked end to end in a continuous chain in which movement of any of said cassettes is transmitted by pulling to an adjacent of said cassettes.
7. A transfer ring as claimed in claim 3 wherein:
    said guide comprises a series of cassettes, each cassette having open top and bottom faces and closed side and end faces;
    each cassette contains a plurality of said adjacent segments; and
    said end faces of said cassettes act as said constraining means.
8. A transfer ring as claimed in claim 7 wherein said cassettes are arranged end to end in a continuous carousel in which movement of any of said cassettes is transmitted by pushing to an adjacent of said cassettes.
9. A transfer ring as claimed in claim 7 wherein said cassettes are linked end to end in a continuous chain in which movement of any of said cassettes is transmitted by pulling to an adjacent of said cassettes.
10. A transfer ring as claimed in claim 1 or 2 wherein said guide moves about an axis in a generally circular path and said first direction is parallel to said axis.
11. A transfer ring as claimed in claim 2 wherein:
    said guide moves about an axis in a generally circular path;
    said first direction is parallel to said axis; and
    said segments taper toward said axis to provide a generally constant spacing between adjacent faces of said segments.
12. A transfer ring as claimed in claim 1 or 2 wherein:
    said guide moves about; an axis in a generally circular path; and
    said first direction is radial to said axis.
13. A transfer ring as claimed in claim 3 wherein:
    said guide moves about an axis in a generally circular path;
    said first direction is radial to said axis; and
    said segments taper toward said axis to provide a generally constant spacing between adjacent faces or said segments.
14. A transfer ring as claimed in claim 10 wherein:
    a ring gear extends radially outwardly relative to said axis about said guide and is constrained to move with said guide.
15. A transfer ring as claimed in claim 10 wherein:
    said outer member is radially outward of said inner member relative to said axis; and
    a ring gear extends radially about and is constrained to rotate with said outer member.

16. A no-slip continuously variable transmission comprising:

an input gearset;

a transfer ring meshing with said input gearset and receiving rotational input from said input gearset;

an output gearset meshing with and receiving rotational input from said transfer ring;

said transfer ring includes a guide mounted in a guide support structure;

said guide is constrained to move about an endless path of generally fixed size and shape defined by said guide support structure;

a plurality of adjacent segments are mounted within said guide, said guide interacting with said segments to allow said segments to be slidably displaced back and forth relative to each other in a first direction, said segments having opposite end faces which extend beyond said guide in said first direction, stop means acting between said guide and said adjacent segments to limit said back and forth displacement, and constraining means to constrain said guide to move with said segments about said path, said constraining means extending between and rigidly connecting an inner member of said guide and an outer member of said guide;

at least one of said input and output gearsets includes a pair of bevel gears mounted with adjacent toothed bevel faces in a generally parallel spaced apart relationship on opposite sides of said guide, said pair of bevel gears are rotationally coupled to rotate in equal amounts but in opposite directions relative to each other with the teeth of one bevel gear in said pair of bevel gears registering with the spaces between the teeth of the other bevel gear of said pair of bevel gears and said bevel gears are mounted so as to capture some of said segments of said guide to move about said path; and said transfer ring is movable by the locator across said guide to vary to relative rotational speeds of said guide and said pair of bevel gears.

17. A non-slip continuously variable transmission as claimed in claim 16 wherein:

said guide moves about an axis in a generally circular path; said segments taper toward said axis to provide a generally constant spacing between adjacent faces of said segments;

a ring gear extends radially outwardly about said guide and is constrained to move with said guide;

said input gearset comprises said pair of bevel gears;

said output gearset includes a pinion gear which meshes with said ring gear.

18. A no-slip continuously variable transmission as claimed in claim 17 wherein:

said pinion gear has a splined hub which is slidably mounted on a splined shaft;

said splined hub is rotationally connected by a first constant velocity joint to an intermediate shaft; and, said intermediate shaft is rotationally coupled by a second constant velocity joint to an output shaft.

19. A no-slip continuously variable transmission as claimed in claim 17 wherein:

said pinion gear is coupled to and rotates coaxially with a first bevel gear;

said first bevel gear meshes with and rotates a second bevel gear;

said second bevel gear is rotationally coupled to rotate coaxially with a second pinion gear having an axis of rotation generally perpendicular to the axis of rotation of said pinion gear;

said second pinion gear meshes with and is slidable along output shaft gear;

said transfer ring, ring gear, pinion gar, first and second bevel gears and second pinion gear are moveable in unison relative to said input gearset and said output shaft gear.

20. A no-slip continuously variable transmission as claimed in claim 17 wherein:

said pinion gear is coupled to and rotates coaxially with a first bevel gear;

said first bevel gear meshes with a second bevel gear having an axis of rotation generally perpendicular to the axis of rotation of said first bevel gear;

said second bevel gear has a splined hub and is mounted on and slidable along a splined output shaft;

said transfer ring, ring gear, pinion gear, first and second bevel gear, are movable in unison relative to said input gearset and said splined output shaft.

21. A non-slip continuously variable transmission as claimed in claim 16, 17, 18, 19 or 20 wherein said bevel gears have a cycloidal contact surface having a mid height contact angle no greater than 60°.

22. A continuously variable transmission comprising:

an input gearset and an output gearset each having a pair of bevel gears constrained to rotate about generally coplanar respective axes of rotation with adjacent toothed bevelled faces in a spaces apart parallel relationship defining an opening therebetween;

said input and output gearsets being mounted opposite each other with said openings aligned;

said pairs of bevel gears of each said gearset being rotationally coupled to rotate in equal amounts but in opposite directions relative to each other about said respective axes of rotation and aligned with the teeth of one of said bevel gears corresponding to the spaces between adjacent teeth of the other of said bevel gears;

a transfer ring having a plurality of radially aligned adjacent segments constrained to rotate about a transfer ring axis in an endless path of generally fixed size and shape and individually moveable parallel to said transfer ring axis by a predetermined amount between first and second stops;

said segments tapering toward said transfer ring axis;

said transfer ring being mounted between said input and output gearsets with portions of some of said segments interspersed in some of said spaces between adjacent teeth of said bevel gears in each said input and output gearsets;

said transfer ring having annular inner and outer guide members, said inner guide member being disposed radially inwardly of said outer guide member relative to said transfer ring axis with said segments mounted therebetween and slidable relative thereto, said inner member being rigidly connected to said outer member by radially extending fixed segments which act as constraining means to prevent relative rotational and axial movement between said inner and outer guide members and to limit movement of said segments relative to said guide members about said path;

said segments being axially moveable by individual teeth of one said bevel gears into the corresponding space of said spaces of the other of said bevel gears;

an adjustable locator for moving said transfer ring laterally between said input and output gearsets with said transfer ring axis remaining generally coplanar with said axis of rotation of said bevel gears;

whereby rotation of said bevel gears of said input gearset about said axes of rotation causes said transfer ring to rotate about said transfer ring axis to further cause rotation of said bevel gears of said output gearset in an amount determined by the lateral location of said transfer ring relative to said input and output gearsets, the portion of said transfer ring passing between said adjacent bevel gears conforming by said axial movement of said segments to the shape of the space defined between adjacent portions of said bevel gears.

23. A continuously variable transmission as claimed in claim 22 wherein:

said locator has a body slidably mounted to said inner guide member for back and forth movement across said transfer ring axis;

an inner end of said pairs of bevel gears are mounted to said body of said locator;

a rack is mounted to said transfer ring along a side of said body of said locator;

a pinion is mounted to a pinion shaft secured to said body of said locator; said pinion engages said rack to cause, in response to rotation of said pinion, relative longitudinal movement between said transfer ring and said body along with said pairs of bevel gears.

24. A continously variable transmission as claimed in claim 22 or 23 wherein said bevel gears have a cycloidal contact surface having a mid-height contact angle no greater than 60°.

* * * * *